INVENTOR.
OLIVER K. KELLEY
BY
J. L. Chisholm
ATTORNEY

Dec. 18, 1962 O. K. KELLEY 3,068,976
TRANSMISSION
Original Filed Oct. 22, 1952 4 Sheets-Sheet 4

INVENTOR.
OLIVER K. KELLEY
BY
J. L. Chisholm
ATTORNEY

United States Patent Office 3,068,976
Patented Dec. 18, 1962

3,068,976
TRANSMISSION
Oliver K. Kelley, Bloomfield Hills, Mich., assignor to General Motors Corporation, Detroit, Mich., a corporation of Delaware
Application Apr. 18, 1958, Ser. No. 731,569, which is a continuation of application Ser. No. 317,095, Oct. 22, 1952. Divided and this application Nov. 9, 1959, Ser. No. 851,685
12 Claims. (Cl. 192—13)

This is a division of my application Serial No. 731,569, which is a continuation of S.N. 317,095, filed Oct 22, 1952, now abandoned.

This invention relates to power transmissions for automotive vehicles, and particularly to means for driving, steering and braking vehicles and to controls therefor. It is especially, but not exclusively, suitable for use on track-laying vehicles.

The objects include an improved control system for a vehicle, and particularly one of the track laying type wherein, through the means of common control elements, an operator may manipulate brakes for the vehicle, and control power output torque-establishing devices such as clutches of the vehicle. In this way the vehicle may be controlled and steered easily.

Specifically, it is an object to provide improved and simplified controls for braking and for steering the vehicle which controls include individually operated brakes, which if applied equally, brake the vehicle in a straight line, and which if applied unequally operate a steering valve which controls individual output torque-establishing devices or clutches for the two tracks, which clutches are thereby individually applied or released to assist in steering.

These and other objects will be fully appreciated as the following detailed description is considered in conjunction with the accompanying drawings. The drawings show one form of transmission which embodies the invention.

Figure 1:
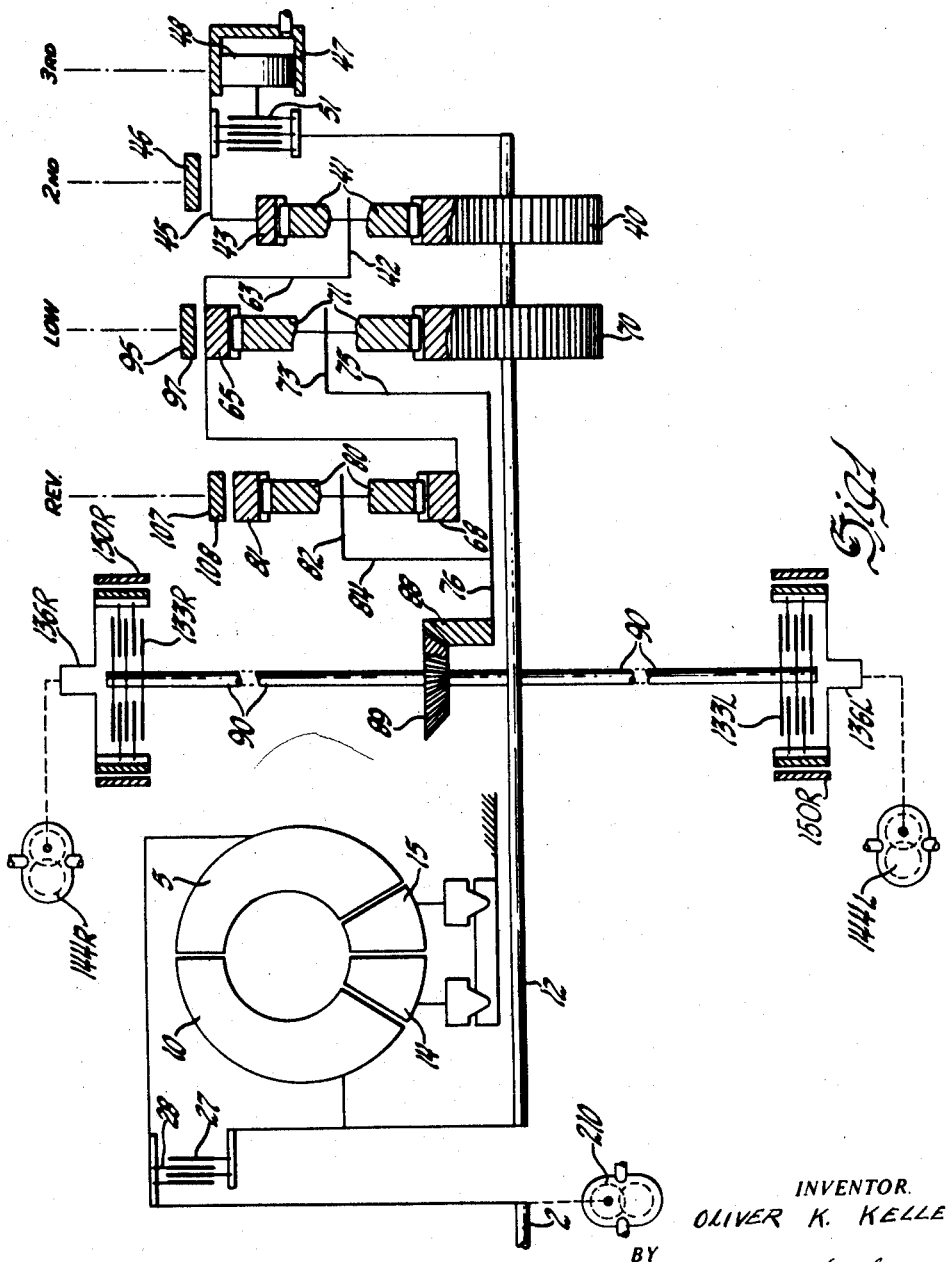
Figure 2:
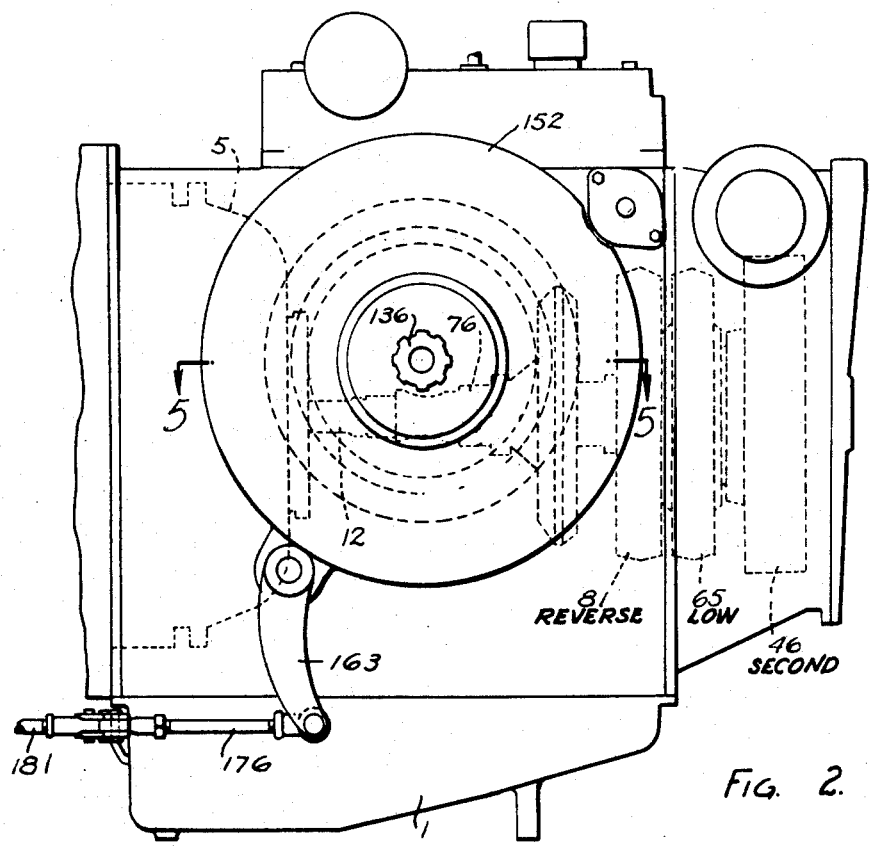
Figures 3, 4:
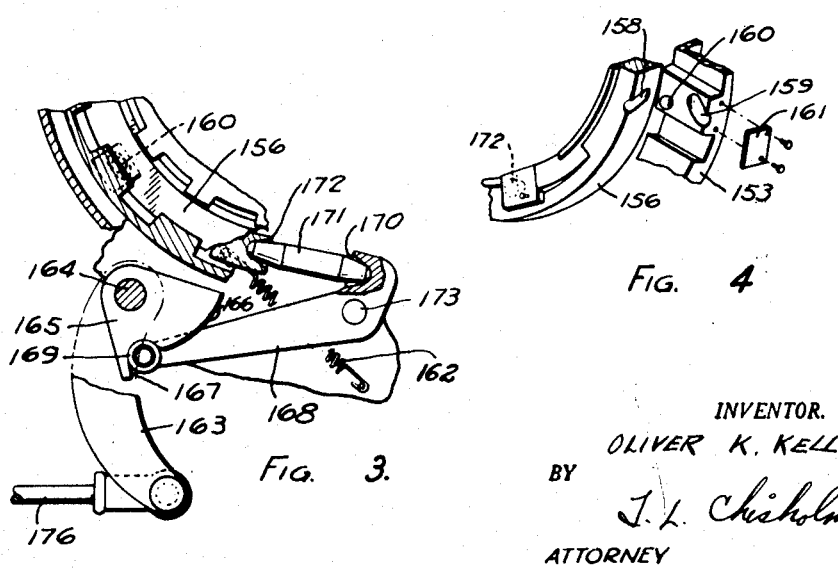
Figure 5:
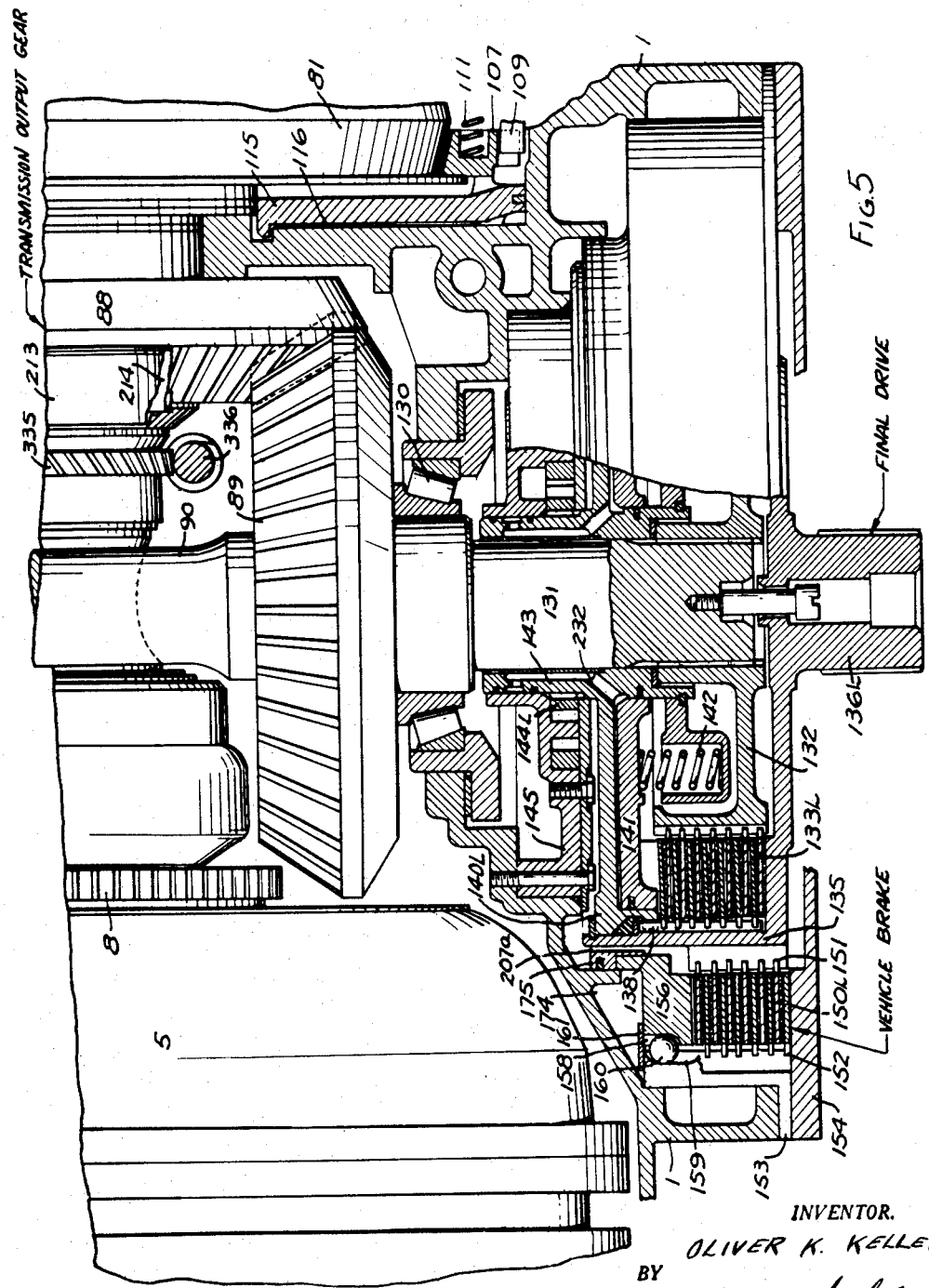
Figure 6:
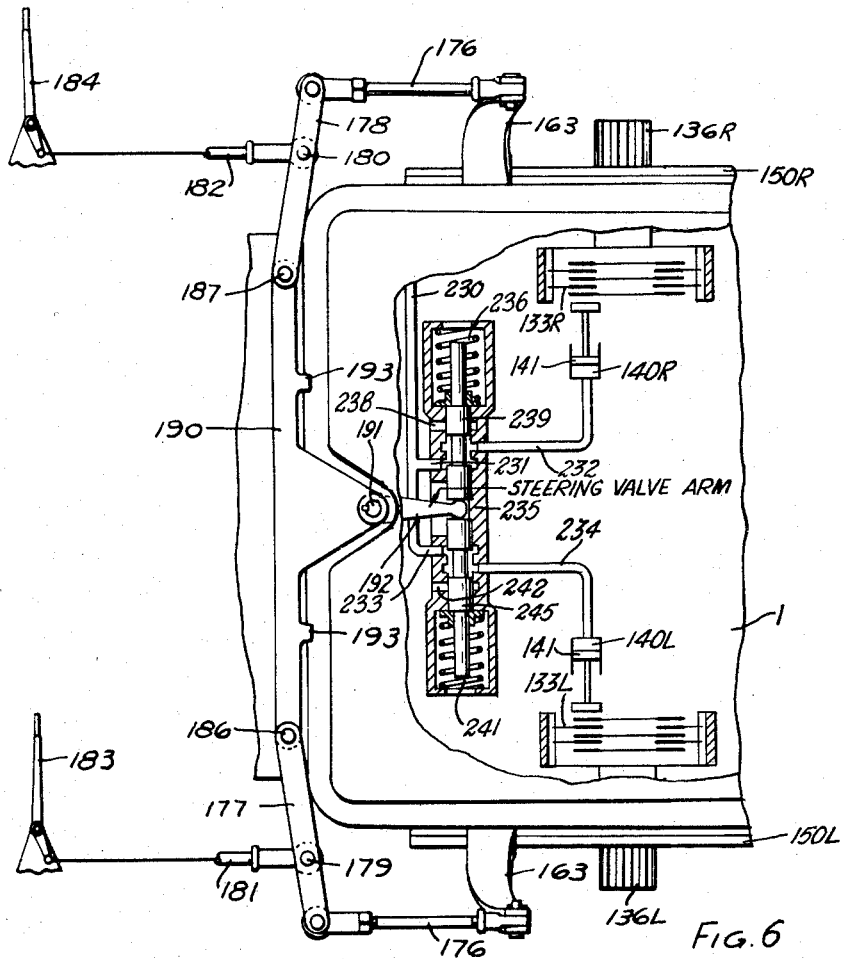

FIG. 1 is a schematic representation of a transmission and final drive embodying one form of the invention, the transmission being shown as one-half of a longitudinal section which is symmetrical about its axis, FIG. 2 is a side elevation of one form of actual structure of the transmission housing showing some of the inner structural parts in dotted lines and illustrating external brake and steering control mechanism, FIG. 3 is a detailed view partly in section illustrating a manual control for brakes, FIG. 4 is an exploded perspective illustrating brake actuating structure, FIG. 5 is a view illustrating the structure of the cross drive shaft showing the controlling clutch arrangement at one output end of the drive shaft and taken substantially on line 5—5 of FIG. 2, and FIG. 6 is a view showing the braking and steering control arrangement to be manipulated by an operator, part of the hydraulic control for the final drive clutches being shown schematically.

As shown in FIG. 1 the transmission has a torque converter including an impeller 5 driven by an engine 2, a turbine 10 and reaction elements 14 and 15. The turbine 10 rotates a converter output shaft 12 which can be connected to the impeller 5 by a lock-up clutch 27—28 when it is desired to drive the shaft 12 directly from the engine. The converter output shaft is the input shaft for a planetary change-speed transmission including two input sun gears 40 and 70 driven by the shaft 12. The sun gear 70 meshes with planets 71 mounted on a carrier 73—74—75 and meshing with a reaction ring gear 65 which may be held by a brake 95—97 to drive the carrier forward at low speed. The carrier is connected to output shaft 76. The sun gear 40 meshes with planets 41 mounted on a carrier 42—63 and meshing with a reaction ring gear 43 which can be held by a brake 46 to drive the carrier 42—63 forward when the brake 95—97 is released. This drives the ring gear 65 forward and thereby drives the carrier 73—74—75 forward faster than when the ring gear 65 is held, because sun gear 70 is also rotating. This effects second speed. Third speed, or direct drive through the gearing, is established by locking up the planetary gearset 40—42—43 by a clutch 51 which can connect ring gear 43 to sun gear 40 when it is set by a piston 48 in a hydraulic cylinder 47.

Reverse is established by a third planetary gearset including an input sun gear 68 driven by the ring gear 65 and meshing with planets 80 mounted on a carrier 82—84 connected to the output shaft, and also meshing with a reverse reaction ring gear 81 which can be held by reverse brake 107—108. When all other friction torque-establishing devices are released and the reverse brake 107—108 is set, forward torque on sun gear 70 drives 107—108 is set, forward torque on sun gear 70 drives ring gear 65 backward because the carrier 73—74—75 is initially held by the resistance of the output shaft 76, which is geared to the vehicle, as will be explained. Reverse rotation of ring gear 65 rotates sun gear 68 backward, which, when ring gear 81 is held, rotates carrier 82—84 backward to drive output shaft 76 backward.

A final drive gear 88 is keyed to output shaft 76 and meshes with bevel gear 89 keyed to cross shaft 90 which at its ends has final drive clutches 133R or 133L which can be engaged to rotate final drive shafts 136R and 136L. The clutches can be operated independently and the final drive shafts can be separately or simultaneously retarded by brakes 150R and 150L. The shafts 136R and 136L may drive tracks, and the vehicle can be steered by various combinations of clutching and braking, as will be explained. One or more pumps, represented by 210 in FIG. 1 may be connected so as to be driven whenever the engine is running, and a pair of pumps 144L and 144R may be driven by the final drive shafts whenever the vehicle is moving. This provides oil under pressure for hydraulic control, cooling and lubrication.

One form of actual structure of a final drive clutch and ground brake is shown in FIG. 5. The cross shaft 90 extends toward opposite sides of the vehicle but only the left side is shown in the drawing, it being understood that the arrangement at the right side is similar.

The cross shaft is journalled in a pair of bearings as 130, beyond which it extends as at 131. Keyed to each end portion 131 is a clutch driving hub 132. The clutch comprises multiple discs 133L, the driving discs being splined to the hub 132 and the driven discs being splined to the drum 135 of a final drive shaft 136L which is adapted to receive a traction member or traction driving member. In the case of a track-laying vehicle, the traction member to be received by the final drive 136L is a sprocket for driving the track. Keyed or otherwise secured to the drum 135 as at 138 is a hydraulic cylinder 140L within which is a piston 141 for engaging the clutch to connect the cross shaft 90 to the final drive member 136L. Suitable springs 142 normally hold the piston 141 off to allow the clutch discs 133L to be disengaged. The cylinder member 140L has an extending sleeve 143 to which is attached the driving member of a hydraulic pump 144L, the pump being completed by a pump housing member 145 secured to the casing I.

A brake construction involves a multiple disc brake structure 150L, the driven discs of which are splined to the flange 135 at 151, and the fixed discs of which are splined at 152 to a fixed brake housing 153 fastened to the housing I. The brake structure is enclosed by a plate 154. The brake is arranged to be engaged by rotation of a cam ring 156, which also is a brake pressure plate. This is illustrated in FIGS. 3 and 4. The ring 156 has a plurality of circumferentially spaced angular or helical cam grooves 158. The brake housing 153 has a plurality of circumferentially spaced angular or helical cam grooves 159. The grooves 158 and 159 match each other and hold a ball 160. When the ring 156 is rotated relative to the brake housing, the balls exert force to urge the ring 156 downwardly as FIG. 5 is viewed, to engage the brake 150L. Each of the several balls in their matching grooves may be retained therein and enclosed by a plate 161.

As shown in FIG. 3, the brake ring 156 may be normally held retracted by a releasing spring 162. There is a brake on each side of the transmission and for manually operating each cam ring 156 there is a lever 163 pivoted at 164 and fixed to a cam element 165 with a cam surface 166 and a notch 167. Another lever 168, pivoted at 173 within the casing has a roller 169 for engaging the cam element 165. The lever 168 has a recess 170 for receiving one end of the strut 171, the opposite end of which is positioned in the recess 172 in one end of the cam ring 156. Normally, under the action of the spring 162 parts are in the position shown in FIG. 3 with the roller 169 seated in the notch 167. When the lever 163 is rocked clockwise as FIG. 3 is viewed, the cam surface 166 engages the roller, rocks the lever 168, causes the strut to shift the cam ring 156 clockwise. The cam action of the balls in the recesses 158 and 159 shifts the cam ring 156 downwardly as FIG. 5 is viewed to engage the brake 150L. This ground brake structure is confined in a brake chamber 174 which has a sealing element 175.

As shown in FIG. 6 the two braking levers 163 are operable by rods 176. One rod is connected to a link 177 and the other is connected to a link 178 and these links are connected to pivots 179 and 180 between their ends to link members 181 and 182, which are in turn connected respectively to steering and brake levers 183 and 184. The opposite ends of the links 177 and 178 are pivoted as at 186, 187 to a rocker arm 190 pivoted at 191 to the housing and keyed to a steering valve operating arm 192 the purpose of which will presently be seen. Projections 193 may strike the housing 1 to limit the rocking action of member 190.

*Steering Control*

The main pressure line has a branch 230 (FIG. 6) which extends to valves for controlling the output clutches. Connecting into the right hand clutch control valve is a pressure supply port 231 and leading therefrom is a line 232 which extends to the cylinder 140R. A port 233 connects line 230 into the left-hand control valve and line 234 supplies the cylinder 40L of the left output clutch 133L. The right-hand valve 239 is held normally against a center stop 235 by a spring 236 and it normally connects the lines 231—232 to engage clutch 133R. The right-hand valve has an exhaust port 238. The left-hand valve 245 is similarly constructed with spring 241 and exhaust port 242. The valve controlling arm 192 lies between the two valve members. As FIG. 6 is viewed, if the arm 192 is swung counter-clockwise, the connection between the lines 231 and 232 is closed and 232 is opened to the exhaust 238 to release clutch 133R. Movement of the arm 192 clockwise will, in a similar manner, cause the left-hand output clutch to become disengaged.

This action is employed in the steering and manipulation of a track laying vehicle, and the action is coupled with the manual control of the right and left-hand brakes, the left-hand brake being shown in FIG. 5 at 150L. The operator may apply both hands to the control levers 183— 184 (FIG. 6) and if the operator applies equal force to both control members, both the manual brakes are applied to retard the vehicle in a straight line of movement, both clutches remaining engaged because lever 190 cannot rotate. To turn the vehicle, for example, to the left, the operator applies more force to the left lever 183. This causes the double crank lever member 190 to rock on its axis 191 thus shifting arm 192 clockwise to move the steering valve 245 to disengage output clutch 133L while the link 177 applies the left brake 150L so that the vehicle is turned to the left being propelled by the right clutch 133R. The right-hand output clutch and the right-hand brake are similarly controlled by the right-hand valve 239 and right-hand lever 184.

I claim:

1. A power transmission for a vehicle comprising in combination input driving means, a pair of output drive members for operating propelling means on opposite sides of the vehicle, a torque-establishing device for rotating each of the output drive members from the input driving means, a brake for each output member, independently operable means for setting each brake, releasing means for both torque-establishing devices, and means connecting the releasing means to both brake setting means for releasing one torque-establishing device in response to application of unequal forces to the two brake-setting means and for maintaining both torque-establishing devices engaged in response to application of equal forces to the two brake-setting means.

2. A power transmission for a vehicle comprising in combination input driving means, a pair of output drive members for operating propelling means on opposite sides of the vehicle, a torque-establishing device for rotating each of the output drive members from the input driving means, a brake for each output member, independently operable means for setting each brake, releasing means for both torque-establishing devices, a force-balancing link connected to the releasing means, and a connection between each brake-setting means and the link for moving the link to operate the releasing means to release one torque-establishing device in response to application of unequal forces to the two brake-setting means and for preventing movement of the link in response to application of equal forces to the two brake-setting means.

3. A power transmission for a vehicle comprising in combination input driving means, a pair of output drive members for operating propelling means on opposite sides of the vehicle, a torque-establishing device for rotating each of the output drive members from the input driving means, a brake for each output member, independently operable means for setting each brake, releasing means for both torque-establishing devices, a link mounted on a pivot and connected to the releasing means, and connections between the two brake-setting means and the link on opposite sides of the pivot for rotating the link to operate the releasing means to release one torque-establishing device in response to application of unequal forces to the two brake-setting means and for preventing rotation of the link in response to application of equal forces to the two brake-setting means.

4. A power transmission for a vehicle comprising in combination input driving means, a pair of output drive members for operating propelling means on opposite sides of the vehicle, a torque-establishing device for rotating each of the output drive members from the input driving means, a fluid pressure motor for engaging each torque-establishing device, means for pressurizing each motor, a brake for each output member, independently operable means for setting each brake, a link mounted on a pivot and rotatable in opposite senses to vent one or the other of the motors, and means connecting the link on opposite sides of the pivot to the two brake-setting means for preventing rotation of the link in response to equal forces on the two brake-setting means and for rotating the link to release one or the other of the torque-establishing devices in response to unequal forces on the two brake-setting means.

5. A power transmission for a vehicle comprising in combination input driving means, a pair of output drive members for operating propelling means on opposite sides of the vehicle, a torque-establishing device for rotating each of the output drive members from the input driving means, a fluid device for activating each torque-establishing device, means for filling each device, a valve for emptying each device, a brake for each output member, independently operable means for setting each brake, a link mounted on a pivot and rotatable in opposite senses to operate one or the other of the valves, and means connecting the link on opposite sides of the pivot to the two brake-setting means for preventing rotation of the link in response to application of equal forces to the two brake-setting means and for rotating the link to operate one but not the other of said valves in response to application of unequal forces to the two brake-setting means.

6. A power transmission for a vehicle comprising in combination input driving means, a pair of output drive members for operating propelling means on opposite sides of the vehicle, a torque-establishing device for rotating each of the output drive members from the input driving means, a fluid device for activating each torque-establishing device, means for filling both devices, a valve for emptying each device, a brake for each output member, independently operable means for setting each brake, and means connecting both valves to both brake-setting means for operating one of the valves but not the other to release one torque-establishing device in response to application of unequal forces to the two brake-setting means and for preventing operation of both valves in response to application of equal forces to the two brake-setting means.

7. In a transmission and control mechanism for a vehicle, a drive shaft, two final driving members, one for a traction element at each side of the vehicle, a clutch interposed between the drive shaft and each final drive member, means for engaging the clutches, a friction brake for each final drive member, combined control means for the clutches and friction brakes comprising, a pivoted member rotatable in opposite senses, means actuated by the pivoted member when it rotates in one sense for releasing one clutch, means actuated by the pivoted member when it rotates in the opposite sense for releasing the other clutch, and control means for rotating the pivoted member to release one clutch in response to application of unequal forces to the two brakes and for preventing rotation of the pivoted member in response to application of equal forces to the brakes, said control means including two links, each pivotally connected to the pivoted member, actuating means for each brake including an actuating element connected to one link, and a movable control element connected to each link for applying force to one brake.

8. In a transmission and control mechanism for a vehicle, a drive shaft, two final driving members, one for a traction element at each side of the vehicle, a clutch interposed between the drive shaft and each final drive member, means for engaging the clutches, a friction brake for each final drive member, a pivoted member rotatable about a substantially centrally located fulcrum, means actuated by the pivoted member when it rotates in one sense to release one clutch, means actuated by the pivoted member when it rotates in the opposite sense to release the other clutch, and control means for rotating the pivoted member to release one clutch in response to application of unequal forces to the brakes and for preventing rotation of the pivoted member in response to application of substantially equal forces to the brakes, said control means including two links, each pivoted to the pivoted member at points substantially equidistant from the fulcrum and on opposite sides of the fulcrum, actuating means for each brake including a brake-apply element connected to one link, and two movable control elements connected respectively to the two links for applying force to the brakes.

9. In a transmission and control mechanism for a vehicle, a drive shaft, two final driving members, one for a traction element at each side of the vehicle, a clutch interposed between the drive shaft and each final drive member, means for engaging the clutches, a friction brake for each final drive member, a rotatable pivoted member, means actuated by the pivoted member when it rotates in one direction to release one clutch, means actuated by the pivoted member when it rotates in the opposite direction to release the other clutch, and control means for preventing rotation of the pivoted member in response to application of forces of predetermined relationship to the brakes and for rotating the pivoted member to release one clutch which drives one final driving member substantially simultaneously with the application of the brake to said one final driving member in response to application to the brakes of forces varying from said predetermined relationship, said control means including two links each pivotally connected to the pivoted member, actuating means for each brake including an actuating element connected to one link, and two movable control elements connected to the respective links for applying force to the brakes.

10. In a transmission and control mechanism for a vehicle, a drive shaft, two final driving members, one for a traction element at each side of the vehicle, a clutch interposed between the drive shaft and each final drive member, means for engaging the clutches, a friction brake for each final drive member, a pivoted rotatable double crank lever, means actuated by the lever when it rotates in one sense to release one clutch, means actuated by the lever when it rotates in the opposite direction to release the other clutch, and control means for preventing rotation of the lever in response to application to the brakes of forces of predetermined relationship and for rotating the lever for releasing one clutch for a final drive member and for applying the brake for said one final drive member in response to application to the brakes of forces varying from said predetermined relationship, said control means comprising a link pivoted to one arm of the lever, a link pivoted to the other arm of the lever, actuating means for each brake including an actuating element connected to one link, and two movable control elements each connected to one link and each operable to apply brake force to that link.

11. In a transmission and control mechanism for a vehicle, a drive shaft, two final drive members, one for a traction element at each side of the vehicle, a clutch interposed between the drive shaft and each final drive member, means for engaging the clutches, a friction brake for each final drive member, a rotatable member mounted on a pivot, means actuated by the pivoted member when it rotates in one direction to release one clutch, means actuated by the pivoted member when it rotates in the opposite direction to release the other clutch, and control means for preventing rotation of the pivoted member in response to the application of substantially equal forces to the brakes and for rotating the pivoted member to release the clutch for one final driving member and for engaging the brake for said one final driving member in response to application of unequal forces to the brakes, said control means including two links pivoted to the pivoted member at points equidistant from the pivot and on opposite sides of the pivot, actuating means for each brake including an actuating element connected to one link, and two movable control elements each connected to one link and operable to apply forces to the links for rocking them on their pivotal connections to the pivoted member to apply the brakes.

12. In a transmission and control mechanism for a vehicle, a drive shaft, two final driving members, one for a traction element at each side of the vehicle, a clutch interposed between the drive shaft and each final drive member, means for engaging the clutches, a friction brake for each final drive member, a rotatable member mounted on a pivot, means actuated by the pivoted member when it rotates in one direction to release one clutch, means actuated by the pivoted member when it rotates in the opposite direction to release the other clutch, and control means for preventing rotation of the pivoted member in response to the application of substantially equal forces to the brakes and for rotating the pivoted member to release the clutch for one final driving member and for engaging the brake for said one final driving member in response to application of unequal forces to the brakes, said control means including two links pivoted to the pivoted member at points equidistant from and on opposite sides of the pivot, actuating means for each brake including an actuating element connected to each link and two manually operable control elements each connected to a link for applying forces to the links for rocking them on their pivotal connections to the pivoted member to apply the brakes.

References Cited in the file of this patent

UNITED STATES PATENTS

| | | |
|---|---|---|
| 2,158,935 | Gustafson | May 16, 1939 |
| 2,392,423 | Stephens | Jan. 8, 1946 |
| 2,712,370 | Westfall | July 5, 1955 |
| 2,791,918 | Frellsen | May 14, 1957 |
| 2,817,426 | Clark et al. | Dec. 24, 1957 |
| 2,817,427 | Clark et al. | Dec. 24, 1957 |
| 2,912,884 | Christenson et al. | Nov. 17, 1959 |

FOREIGN PATENTS

| | | |
|---|---|---|
| 725,686 | Great Britain | Mar. 9, 1955 |